United States Patent [19]

Young

[11] Patent Number: 4,751,769
[45] Date of Patent: Jun. 21, 1988

[54] BAND CLAMP WITH FORMABLE BUCKLE

[75] Inventor: Thomas F. Young, Simi Valley, Calif.

[73] Assignee: Sunbank Electronics, Inc., Paso Robles, Calif.

[21] Appl. No.: 106,375

[22] Filed: Oct. 6, 1987

[51] Int. Cl.⁴ ............................................. B65D 63/02
[52] U.S. Cl. ........................... 24/20 R; 24/20 EE; 24/23 W
[58] Field of Search ............ 24/20 R, 20 CW, 20 EE, 24/20 TT, 20 W, 23 B, 23 W, 23 EE, 17 R, 25

[56] References Cited

U.S. PATENT DOCUMENTS

| | | | |
|---|---|---|---|
| 1,084,407 | 1/1914 | Deist | 24/20 EE |
| 2,163,048 | 6/1939 | McKee | 24/23 W |
| 2,188,710 | 1/1940 | Giovanini et al. | 24/23 W |
| 2,192,979 | 3/1940 | McAneny, Jr. | 24/23 B |
| 3,000,433 | 9/1961 | Kemper | 24/23 W |
| 4,646,393 | 3/1987 | Young | 24/20 R |

FOREIGN PATENT DOCUMENTS 102595  12/1923  Switzerland ............ 24/20 EE

OTHER PUBLICATIONS

Data Sheet-EAK 214 Tool Kit Price Graphics, Canoga Park, Calif. 7/86, 4 pages.
"Calibrated Banding-The System Approach . . ." by Thomas F. Young, 19th Annual Symposium-Electronic Connector Study Gp., Inc. Anaheim, Calif., 10/7/86, 6 pp.

Primary Examiner—Victor N. Sakran
Attorney, Agent, or Firm—Sheldon & Mak

[57] ABSTRACT

A band clamp having an integral buckle includes an elongated band; a buckle member at one end of the band and having a base in the plane of the band, side portions and a top portion connecting the side portions forming a loop for retaining one or more passes of the band; and a tongue member extending in the plane of the base opposite the band, a pair of notches extending into the base at the sides of the tongue. When tension is applied the band with the band extending through the buckle and enclosing the sleeve, the tongue member is deflected toward the sleeve by the band for permanently deforming the base and portions of the sides of the buckle in conformity with the sleeve when the sleeve has an equivalent diameter of less than about 20 times the thickness of the band.

14 Claims, 1 Drawing Sheet

BAND CLAMP WITH FORMABLE BUCKLE

BACKGROUND

The present invention relates to clamping bands for cable bundles and more particularly to a clamp for electrically and mechanically securing a tubular shielding sleeve of the cable to the body of a connector for the cable.

A clamping band for electromagnetic shielding is described in my prior U.S. Pat. No. 4,646,393, which is incorporated herein by reference. This prior band clamp, shown as 10 in FIG. 1, has a single strip of metal forming a strap 12 with an integral buckle 14 at one end, the opposite end of the strap 12 being passed through the buckle for forming a loop that is tightened around a cable sleeve 16 when tension is applied to an extending portion 18 of the strap 12, the strap being doubled over the buckel to secure the clamp 10. A conventional pulling tool such as described in the prior patent can be used for applying the tension, bending, and trimming the strap 12.

As also set out in the prior patent, it is highly desirable that a single configuration of this type of clamp be usuable over a wide range of cable diameters. This is important for reducing fabrication and stocking costs, and for avoiding the selection of an improper band from a set of differing sized bands. Cables that are typically encountered range in diameter from about two inches down to less than 0.250 inch, even as small as 0.156 inch. In the prior patent, clamping down to the smaller sizes is facilitated by providing a transverse slot 20 in the inside of the buckle 14, forming adjacent loops 22 and 24 that move together as the strap 12 is tightened, allowing the loops 22 and 24 to bend in an arcuate manner for closely conforming to small sleeve diameters.

As shown in FIG. 1, a disadvantage exhibited by the clamp bands of the prior patent is that while they are capable of clamping down to the 0.156 inch diameter, the sleeve 16 is subject to damage by being pinched at 26 between the loops 22 and 24 of the buckle 14 as they move together.

Thus there is a need for an improved band clamp that is better able to conform to a small diameter cable without damage to a sleeve of the cable, that is easy to install and use, and is inexpensive to produce.

SUMMARY

The present invention meets this need by providing a band clamp having a buckle that can permanently deform in conformity with a sleeved bundle or cable, but without pinching the sleeve. The clamp includes an elongated band; a buckle member at one end of the band and having a base proximately in the plane of the band, side portions upstanding from the base, and a top portion for retaining a loop of the band between the side portions and between the top portion and the base; and a tongue member extending in the plane of the base opposite the band, a pair of notches extending into the base at the sides of the tongue. When tension is applied the band with the band extending through the buckle and enclosing the sleeve, the tongue member is deflected toward the sleeve by the band for permanently deforming the base of the buckle in conformity with the sleeve when the sleeve has an equivalent diameter of less than about 20 times the thickness of the band. As used herein, "equivalent diameter" means the diameter of a circle having the same cross-sectional area.

DRAWINGS

These and other features, aspects, and advantages of the present invention will become better understood with reference to the following description, appended claims, and accompanying drawings where:

FIG. 1 an axial side view of a prior art band clamp in an installed condition;

DESCRIPTION

Figure 1:
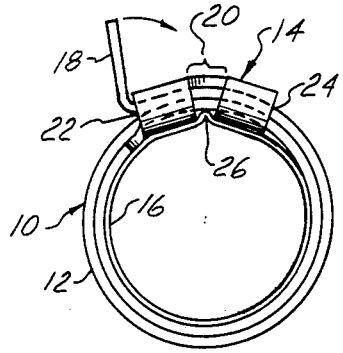
Figure 3:
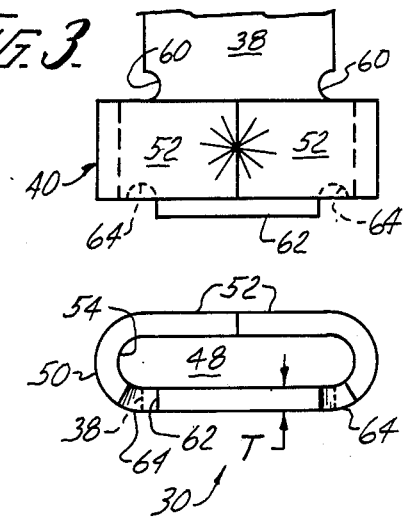
FIG. 3 is a detail plan view the apparatus of FIG. 1 within region 3 of FIG. 2, the appratus being formed according to the present invention.
Figure 4:
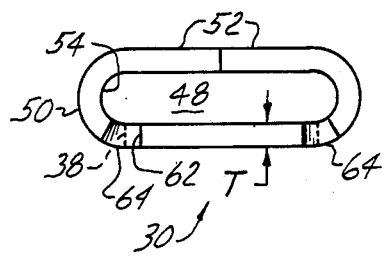
FIG. 4 is an end elevational view of the apparatus of FIG. 3.

The present invention is directed to an improved band clamp for securing a workpiece or bundle such as a shielded electrical cable. With reference to the drawings, particularly FIGS. 2-5, a band clamp apparatus 30 according to the present invention is adapted for embracing a shielding sleeve 32 of an electrical cable 34, the sleeve 32 extending over a tubular connector portion 36 associated with termination of the cable 34. The apparatus 30 includes an elongated band member 38 having a length L and a width W, and a buckle member 40 formed integrally therewith from a single sheet of a ductile material such as corrosion-resistant steel, the sheet having a thickness T.

The buckle member 40 has a base portion 42 at one end of the band member 38 and opposed wings 44 and 46, the wings 44 and 46 each having a width B and beng folded toward each other in abutting relation to form an opening 48. Thus formed, the wings 44 and 46 each comprise a side portion 50 extending upwardly from the base portion 42 and a top portion 52 extending inwardly from the side portion 50 in parallel relation to the base portion 42. The wings 44 and 46 are welded or brazed together at the abutting ends of the respective top portions 52 to form a continuous loop 54 of the buckle member 40 about the opening 48.

Figure 5:
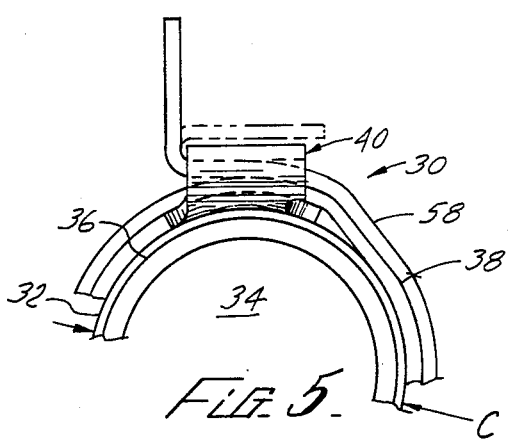
FIG. 5 is an axial side detail view showing the apparatus of FIG. 3 in use.

Installation of the apparatus 30 is accomplished in a conventional manner by wrapping the band member 38 about the sleeve 32 and passing a free end 56 of the band member 38 through the opening 48 of the loop 54, a portion of the band member forming at least one ring 58 about the sleeve 32. With the apparatus 30 positioned at a desired location along the sleeve 32, tension is applied to the free end 56 against the loop 54, thereby tightening the ring 58 about the sleeve. Once the ring 58 is sufficiently tight, the free end 56 is bent against the loop 54 as shown in FIG. 5, thereby securing the apparatus 30 in a clamped condition.

Figure 2:
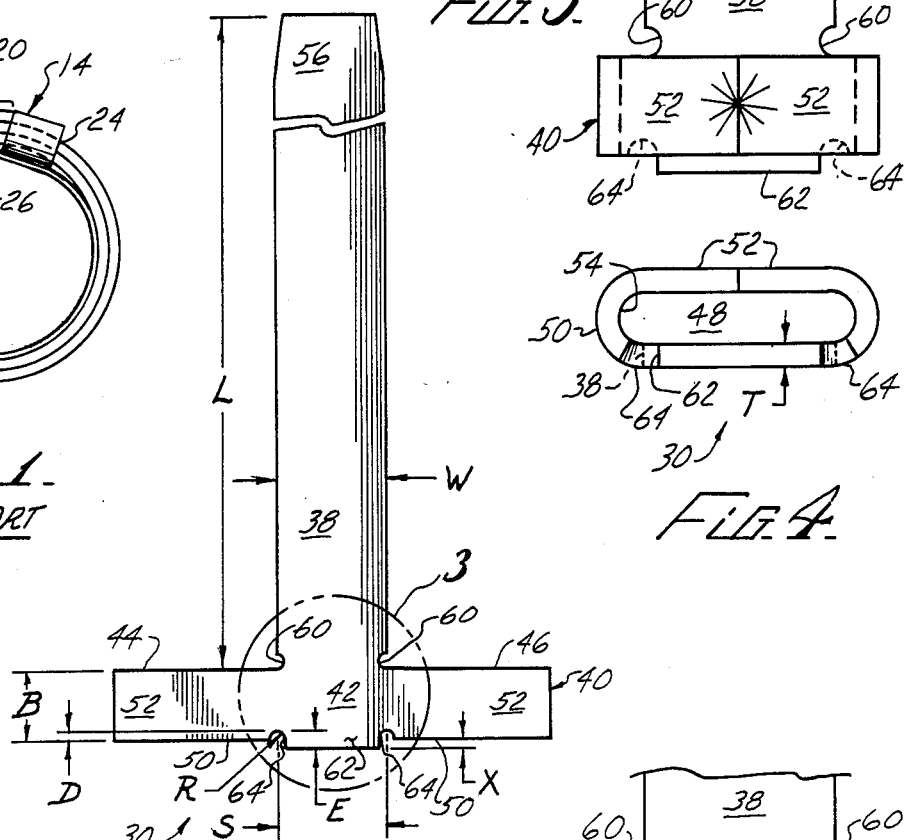
FIG. 2 is a pattern plan view of a band clamp apparatus according to the present invention.

A pair of stress-relieving undercuts 60 is provided in opposite sides of the band member 38 at the intersection of each of the wings 44 and 46 with the base portion 42 for reducing stress concentration in the apparatus 30 when the wings 44 and 46 are folded to form the loop 54 and when tension is applied to the band member 38. As shown in FIG. 2, each undercut 60 is smoothly radiused tangent to a respective one of the wings 44 and 46 of the buckle member 40, in the plane of the sheet material of the apparatus 30.

According to the present invention, the buckle member 40 includes a tongue portion 62 extending between a pair of notches 64 in the base portion 42, the notches being located proximate the intersection of the base portion 42 with the side portions 50, opposite the undercuts 60 of the band member 38. As shown in FIG. 2, the tongue portion has a length E in the direction of the band member 38 and the notches 64 are spaced apart by a distance S in the direction of the width W of the band member 38, the distance S being approximately equal to the width W.

An important feature of the present invention is that when the apparatus 30 is being clamped onto a workpiece by tension in the band member 38, pressure is applied to the tongue portion 62 by the band member 38, the pressure producing a large bending stress in the buckle member 40 proximate the notches 64 when the equivalent diameter C of the workpiece is relatively small. Typically, when the diameter C is less than about 0.25 inch, permanent deformation is produced in the base portion 42 and the side portions 50 when a normal clamping tension of at least 50 pounds is applied to the free end 56 of the band member 38.

It has unexpectedly been discovered that the permanent deformation of the buckle member 40 that is induced by the combination of the tongue member 62 and the notches 64 is not confined to the immediate proximity of the deepest part of the notches 64, but rather extends across the base portion 42 between the notches 64 and between the tongue portion 62 and the band member 38, and partway into the side portions 50, advantageously conforming the buckle member 40 to the diameter C without the disadvantage of pinching the workpiece.

In an exemplary configuration of the present invention, the notches 64 are formed in the flat pattern of the apparatus 30, each notch 64 having a bottom radius R and extending into the width B of the side portions 50 by a distance D, the radius R being approximately equal to the distance S as shown in FIG. 2. The length E of the tongue portion 62 is greater than the distance D by an offset X for enhancing the leverage of the tongue portion 64 in producing the permanent deformation while limiting the depth of the notches 64 within the width B of the side portions 50, thereby preserving the strangth of the loop 54.

Figure 6:
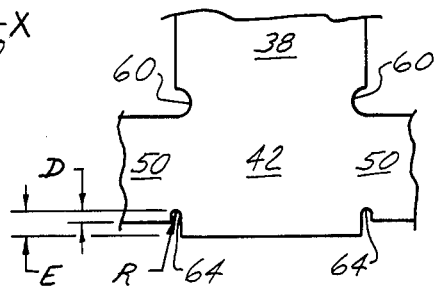
FIG. 6 is a detail plan pattern view showing an alternative configuration of the apparatus of FIG. 1 within region 3 of FIG. 2.

With further reference to FIG. 6, an alternative configuration of the present invention has the notches 64 in the buckle member 40 reduced in width, the radius R being less than the distance D.

A suitable material for fabricating the apparatus 30 is corrosion-resistant steel having a thickness T of between about 0.015 inch and about 0.020 inch, cold-worked to a stress level of about 85 kpsi and having a hardness of 75–85 on the Rockwell B scale. The width W of the band member 38 can be from about 0.22 inch to about 0.4 inch, and the width B of the wings 44 and 46 can be from about 0.13 inch to about 0.16 inch, preferably about 0.145 inch. The notches 62 preferably have a radius R of from 0.01 inch to about 0.4 inch, preferably from about 0.015 to about 0.035 inch. The distance D that the notches 64 extend into the wings 44 and 46 can be from about 0.01 to about 0.03, preferably from about 0.012 to about 0.020.

The offset X by which the tongue portion 62 extends beyond the wings 44 and 46 can range from approximately zero to about 0.03 inch, being preferably between about 0.01 inch and about 0.02 inch.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A band clamp for securing a bundle, comprising:
    (a) an elongated band member having first and second ends, a width and a thickness;
    (b) a buckle member for receiving at least one pass of the first end of the band member, the buckle member being fixed proximate the second end of the band member, the buckle member comprising:
        (i) a base portion proximately in the plane of the second end of the band member;
        (ii) opposite upstanding side portions extending from the base portion and spaced apart for receiving the band member; and
        (iii) at least one top portion extending inwardly from a respective side portion for retaining the band member between the top portion and the base and between the side portions; and
    (c) a tongue member extending from the base in the plane of the base opposite the band member, the tongue member havig a length in the direction of the band member and a width proximate the width of the band member, the intersection of the tongue member and the base forming a pair of notches in the base at the opposite sides of the tongue member,
    whereby, when tension is applied to the first end of the band member, the band member passing through the buckle and enclosing the bundle, the band member deflects the tongue member toward the bundle for producing permanent deformation of the base for conforming the buckle to the shape of the bundle when the bundle is compressed by the band to an equivalent diameter of less than about 20 times the thickness of the band member.

2. The clamp of claim 1 wherein the base of the buckle is integral and coplanar with the second end of the band.

3. The clamp of claim 1 comprising two of the top portions extending inwardly from both of the side portions of the buckle member.

4. The clamp of claim 3 wherein the top portions of the buckle are fixedly joined together.

5. The clamp of claim 4 wherein the top portions of the buckle are welded together.

6. The clamp of claim 5 wherein the top portions of the buckle are brazed together.

7. The clamp of claim 1 wherein the length of the tongue member is at least approximately half the thickness of the base portion.

8. The clamp of claim 7 wherein the length of the tongue member is between approximately the thickness of the base portion and one and one-half times the thickness of the base portion.

9. The clamp of claim 1 wherein the notches in the base extend to a depth relative to the side portions of at least half the thickness of the base portion toward the band member.

10. The clamp of claim 9 wherein the depth of the notches is not greater than about one and one-half times the thickness of the base portion.

11. The clamp of claim 10 wherein the length of the tongue member is greater than the depth of the notches.

12. The clamp of claim 10 wherein the length of the tongue member is greater than the depth of the notches by an offset distance of at least half the thickness of the base portion.

13. The clamp of claim 12 wherein the offset distance is not greater than about one and one-half times the thickness of the base portion.

14. A band clamp for securing a bundle, comprising:
 (a) an elongated band member having first and second ends, a width, and a thickness;
 (b) a buckle member for receiving at least one pass of the first end of the band member, the buckle member being fixed proximate the second end of the band member, the buckle member comprising:
  (i) a base portion coplanar with the second end of the band member and integral therewith;
  (ii) opposite upstanding side portions extending from the base portion and spaced apart from receiving the band member; and
  (iii) at least one top portion extending inwardly from a respective side portion and rigidly connected relative to the other side portion for retaining at least one pass of the band member within a loop formed by the top portion, the side portions and the base portion; and
 (c) a tongue member extending from the base portion in the plane of the base opposite the band member, the tongue member having a length in the direction of the band member and a width proximate the width of the band member, the intersection of the tongue member and the base forming a pair of notches in the base at the opposite sides of the tongue member, the notches extending relative to the side portions toward the band member to a depth of from approximately half to approximately one and one-half times the thickness of the base portion, the length of the tongue member being greater than the depth of the notches by an offset distance of from approximately half to approximately one and one-half times the thickness of the base portion, whereby when tension is applied to the first end of the band member, the band member passing through the buckle and enclosing the bundle, the band member deflects the tongue member toward the bundle for producing permanent deformation of the base end portions of the side members for conforming the buckle to the shape of the bundle when the bundle is compressed by the band to an equivalent diameter of less than about 20 times the thickness of the band member.

* * * * *